United States Patent
Tai et al.

(10) Patent No.: US 7,839,537 B2
(45) Date of Patent: Nov. 23, 2010

(54) METHOD AND APPARATUS FOR MULTI-COLOR PRINTING USING A ROSETTE OR DIAMOND HALFTONE SCREEN FOR ONE OR MORE OF THE COLORS

(75) Inventors: Hwai-Tzuu Tai, Rochester, NY (US); Dmitri Anatolyevich Gusev, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 1097 days.

(21) Appl. No.: 10/836,762

(22) Filed: Apr. 30, 2004

(65) Prior Publication Data
US 2005/0243340 A1    Nov. 3, 2005

(51) Int. Cl.
H04N 1/405    (2006.01)
(52) U.S. Cl. .................. 358/3.2; 358/1.9; 358/3.01; 358/3.02; 358/3.06; 358/3.1; 358/3.12; 358/3.13; 358/533; 358/534; 358/536
(58) Field of Classification Search ........... 358/3.16, 358/3.27, 533, 540, 3.06, 3.13–3.2, 534–536
See application file for complete search history.

(56) References Cited

U.S. PATENT DOCUMENTS

| | | | |
|---|---|---|---|
| 4,537,470 A | | 8/1985 | Schoppmeyer |
| 4,812,899 A | | 3/1989 | Kueppers |
| 4,878,977 A | | 11/1989 | Kueppers |
| 4,924,301 A | * | 5/1990 | Surbrook .................. 358/534 |
| 5,055,923 A | | 10/1991 | Kitagawa et al. |
| 5,067,025 A | | 11/1991 | Kitagawa |
| 5,166,809 A | | 11/1992 | Surbrook .................. 358/456 |
| 5,258,832 A | * | 11/1993 | Rylander .................. 358/527 |
| 5,258,849 A | | 11/1993 | Tai et al. |
| 5,258,850 A | * | 11/1993 | Tai .......................... 358/3.15 |
| 5,381,247 A | * | 1/1995 | Hains ....................... 358/533 |
| 5,546,197 A | * | 8/1996 | Shibazaki et al. ......... 358/534 |
| 5,572,600 A | * | 11/1996 | Tajima et al. ............. 382/163 |
| 5,734,800 A | | 3/1998 | Herbert et al. |
| 5,808,755 A | | 9/1998 | Delabastita |

(Continued)

FOREIGN PATENT DOCUMENTS

EP    0 892 549 A2    1/1999

(Continued)

OTHER PUBLICATIONS

US 7218420 B1 is the US patent of JP 2002057898 A.*

Primary Examiner—King Y Poon
Assistant Examiner—Richard Z Zhu
(74) Attorney, Agent, or Firm—Lawrence P. Kessler; Christopher J. White

(57) ABSTRACT

A method and apparatus for processing image data representing a color separation or mono-color image includes processing the color separation image data or mono-color image data in accordance with first and second or more halftone screen processings at different screen angles and obtaining results of the processings and combining the results of the processings to generate composite image data of the first and second or more halftone screen processings. The resulting print of the composite image data forms relatively pleasing rosettes or diamond structures in the particular color.

62 Claims, 11 Drawing Sheets

U.S. PATENT DOCUMENTS

| | | |
|---|---|---|
| 5,953,988 A | 9/1999 | Vinck |
| 5,956,157 A * | 9/1999 | Tai .............................. 358/3.24 |
| 6,104,502 A * | 8/2000 | Shiomi ........................ 358/1.9 |
| 6,307,645 B1 | 10/2001 | Mantell et al. |
| 6,346,993 B1 * | 2/2002 | Curry .......................... 358/1.9 |
| 6,538,677 B1 | 3/2003 | Thompson et al. |
| 6,608,641 B1 | 8/2003 | Alexandrovich et al. |
| 7,079,287 B1 * | 7/2006 | Ng et al. ...................... 358/2.1 |
| 7,218,420 B1 * | 5/2007 | Tai et al. ...................... 358/3.2 |
| 7,450,269 B2 * | 11/2008 | Tai et al. ..................... 358/3.09 |
| 7,508,549 B2 * | 3/2009 | Tai et al. ....................... 358/3.2 |
| 2002/0097294 A1 | 7/2002 | Shibata et al. ................. 347/43 |
| 2004/0021883 A1 | 2/2004 | Sugizaki |

FOREIGN PATENT DOCUMENTS

| | | |
|---|---|---|
| EP | 1 103 383 A2 | 5/2001 |
| JP | 2002-044448 | 2/2002 |
| JP | 2002057898 A * | 2/2002 |

* cited by examiner

30

| LEVEL 1 | | | |
|---|---|---|---|
| 43 | 36 | 22 | 8 |
| 15 | ① | 29 | 50 |
| 22 | 8 | 43 | 36 |
| 29 | 50 | 15 | 1 |

| LEVEL 2 | | | |
|---|---|---|---|
| 44 | 37 | 23 | 9 |
| 16 | 2 | 30 | 51 |
| 23 | 9 | 44 | 37 |
| 30 | 51 | 16 | 2 |

| LEVEL 3 | | | |
|---|---|---|---|
| 45 | 38 | 24 | 10 |
| 17 | 3 | 31 | 52 |
| 24 | 10 | 45 | 38 |
| 31 | 52 | 17 | 3 |

| LEVEL 4 | | | |
|---|---|---|---|
| 46 | 39 | 25 | 11 |
| 18 | 4 | 32 | 53 |
| 25 | 11 | 46 | 39 |
| 32 | 53 | 18 | 4 |

| LEVEL 5 | | | |
|---|---|---|---|
| 47 | 40 | 26 | 12 |
| 19 | 5 | 33 | 54 |
| 26 | 12 | 47 | 40 |
| 33 | 54 | 19 | 5 |

| LEVEL 6 | | | |
|---|---|---|---|
| 48 | 41 | 27 | 13 |
| 20 | 6 | 34 | 55 |
| 27 | 13 | 48 | 41 |
| 34 | 55 | 20 | 6 |

| LEVEL 7 | | | |
|---|---|---|---|
| 49 | 42 | 28 | 14 |
| 21 | 7 | 35 | 56 |
| 28 | 14 | 49 | 42 |
| 35 | 56 | 21 | 7 |

DIAMOND SCREEN

METHOD AND APPARATUS FOR MULTI-COLOR PRINTING USING A ROSETTE OR DIAMOND HALFTONE SCREEN FOR ONE OR MORE OF THE COLORS

CROSS-REFERENCE TO RELATED APPLICATION

This application is related to U.S. Pat. No. 7,508,549, filed on Apr. 30, 2004 in the names of Tai et al. and entitled, METHOD AND APPARATUS FOR MULTI-COLOR PRINTING USING HYBRID DOT-LINE HALFTONE COMPOSITE SCREENS, the contents of which are incorporated herein by reference.

BACKGROUND OF THE INVENTION

1. Field of the Invention

The present invention relates to the field of digital encoding of pictorial information for use in forming color reproductions on display or printing systems.

2. Description Relative to the Prior Art

With the advent of printing using digital technology, images may be printed, by rendering the image into a set of pixels. In pure binary printers, the pixel is either on (black) or off (white). Such techniques are well suited to reproducing text because the sizes of the individual pixels that make up the symbols are much smaller than the symbols. Thus, the human eye sees the text as a continuous image even though it is a collection of closely spaced dots.

However, most binary print engines and particularly electrophotographic print engines do not provide acceptable levels of gray for other images, such as photographs. Those skilled in the art have used halftone dots to emulate grayscale for reproducing images with continuous tones. One reason for this is that the particles used for forming the printed dots may be larger than is desirable even if the printing system were suited to printing very small binary pixels.

In the area of digital printing (the term "printing" is used to encompass both printing and displaying throughout), gray level has been achieved in a number of different ways. The representation of the intensity, i.e., the gray level, of a color by binary displays and printers has been the object of a variety of algorithms. Binary displays and printers are capable of making a mark, usually in the form of a dot, of a given, uniform size and at a specified resolution in marks per unit length, typically dots per inch. It has been well known to place the marks according to a variety of geometrical patterns such that a group of marks when seen by the eye give a rendition of an intermediate color tone between the color of the background (usually white paper stock) and total coverage, or solid density. The effect is such that a group of dots and dot-less blank spots, when seen by the eye, is a rendition of an intermediate color tone or density between the color of the initial paper stock, usually white, and total ink coverage, or solid density halftone dot. It is conventional to arrange the dots in rows, where the distance between rows is known as line spacing, and determines the number of lines per inch (lpi). In the ensuing paragraphs, discussions will be made in terms of white paper stock; it is understood that white paper stock is used as an illustration and not as a limitation of the invention and that other media may be used such as plastics, textiles, coated papers, metals, wood, edible articles, etc.

Continuous tone images contain an apparent continuum of gray levels. Some scenes, when viewed by humans, may require more than two hundred and fifty six discrete gray levels for each color to give the appearance of a continuum of gray levels from one shade to another. Halftone pictorial or graphical images lower the high contrast between the paper stock and toned image and thereby create a more visually pleasing image. As an approximation to continuous tone images, pictorial imagery has been represented via binary halftone technologies. In order to record or display a halftone image one picture element of the recording or display surface consists of a j×k matrix or cell of sub-elements where j and k are positive integers. A halftone image is reproduced by printing the respective sub-elements (pixels or pels) or leaving them blank, in other words, by suitably distributing the printed marks within each cell.

Another method of producing gray levels is provided by gray level printing. In such a method, each pixel has the capability to render several different dot sizes. In certain electrophotographic printing systems, for example, the dot size for a pixel is a function of the exposure time provided an LED element corresponding to that pixel. The longer the exposure time, the more toner is attracted to that particular pixel.

There are two major concerns in rendering a continuous tone image for printing: (1) the resolution of image details, and (2) the reproduction of gray scales. These two fundamental factors compete with each other in a binary representation scheme. The more gray levels that are rendered, the larger is a halftone cell. Consequently, coarse halftone lines screens are provided, with the attendant poor image appearance. Hence, compromises made in rendering between the selection of line resolution in gray scales and binary halftone printing. However, with gray level halftone printing, one can satisfy both resolution and gray level requirements. In gray level printing, the same number of addressable dots are present, and there is attached a choice of dot sizes from one dot size of 1 bit/pixel to for example 255 different dot-sizes of 8 bits/pixel. Although providing higher image quality with respect to line resolution and tone scales, gray level halftone presents its own dot rendering issues.

A number of different dot layouts are possible to build gray level dots from a cell template. These gray level dots are the digital representation of the gray level screening, and must be realized through a printing process. It is desirable in gray level screening to layout the dots with the printing process characteristics built into it such that the appearance of the dots are pleasing to the eye: less grainy, stable, less artifacts, less texture (i.e., visible screen and its microstructure).

An example of a line screen designed for gray scale rendering is disclosed in U.S. Pat. No. 5,258,850. The arrangement of pixels within a halftone cell is such that growth within a cell to represent increases in density is accomplished through arranging the pixels along lines of growth. Another example of a halftone cell is that shown in U.S. Pat. No. 5,258,849, which features growth of density within a halftone cell by gradual enlargement about a central area within the cell. The halftone cells disclosed in the above two patents are notable in that the pixels we need within each cell may vary in density. This substantially increases the number of gray levels that may be represented by the overall halftone cell from that where the pixels can only be rendered as a binary representation (either black or white with no distinction regarding size). The combination of cells represents a halftone screen.

Color printing on halftone printers involves the formation of color separations as halftone screens for each color, which is to be used to form a color image. The halftone screens are laid down on a predetermined overlapping relationship to each other, which results in generation of the desired color image. A well-known problem when overlapping two or more halftone screens is the possibility of developing a moiré pattern or other form of interference, when the screens are not properly positioned. To avoid the moiré or other undesirable patterns, precise angle combinations of the screens are required. It is known that increasing the difference in angle of two overlaid screens will result in a smaller pattern, making the pattern less apparent. However, the prior art teaches, see for example U.S. Pat. No. 6,307,645, the largest possible angle difference between two overlaid screens should be no more than 45° because a 90° screen is essentially the same as 0°, just as a 135° screen is the same as a 45° screen even in the context of attempting to reduce moiré with asymmetrical dots.

In color image printing it has been common practice to use at least three process colors and in more cases three process colors and black. In the case of four-color printing the printing industry has generated a standardized combination of four halftone angles. In particular and with reference to FIG. 1, the cyan halftone screen is located at 15°, the black halftone screen at 45°, the magenta halftone screen at 75° and the yellow halftone screen at 0°. Since yellow is the lightest and least noticeable color, it can be set at 0°, even though 0° is a highly noticeable angle, and that is only 15° from the nearest neighbor. In some embodiments, the cyan halftone screen is known to be set at 105°, however, with symmetrical dots this is substantially the same as 15°, and the prior art recognizes that even with asymmetrical dots it does not make a large difference.

When the four process colors using the above halftone screen angle combinations are overlaid, the resulting moiré or other interference patterns are as small as possible. A visually pleasing rosette structure is formed when the individual dots grains are oriented 30° apart. The traditional graphics art printing has been made using this 15°/45°/75° angle screen design to form a balanced rosette structure. In the CMYK four-color printing process, the yellow screen is usually designed at 0° or 45°. However, the moiré pattern resulting from the interaction between the yellow screen and the other three individual screens due to mis-registration is not as visually pleasing as a 30° moiré pattern (rosette structure). Yellow is a light color, so this additional moiré is usually acceptable and not very noticeable in most CMYK four-color printing systems. However, careful examination of prints shows that this yellow moiré pattern can be seen in certain composite colors.

U.S. Pat. No. 5,808,755 deals with the problem of moiré in a multi-color printer. The patent suggests the use of a screen having a cluster dot growth pattern that varies in a predetermined way such that the centroid of the cluster dot is not situated within an internal region. The screen can be used to induce a variable rosette structure depending upon the intensity level of the original image. The suggested screen pattern does not lend itself easily to currently available screen designs.

Where additional colors are used such as in a hi-fi color (for example, a five-color) printing system, there is a need to design a fifth screen on top of the original well-balanced CMYK screen set. This is particularly true where the fifth color screen is blue, the complementary color of yellow, and the blue color screen is placed at the same screen angle and screen frequency as the yellow color screen. The unpleasant moiré, which was not noticeable in the yellow color, will now show up in the blue color.

It is thus known that many color printing systems will include five or more printing units using different color colorants. Attempting to incorporate these additional colors is noted to be difficult, especially if each color must have a halftone screen with a unique halftone angle. Particularly, once there are more than four screens with attendant screen angles, which must be laid down, the patterning problems discussed above, are greatly increased. It would thus be desirable to provide for color screen sets for printing which minimize the unpleasant moiré patterns formed including those caused by the interactions of the yellow screen.

SUMMARY OF THE INVENTION

The foregoing objects are realized by the present invention, which provides an apparatus and method for the generation of halftone images with reduced image artifacts and increased number of gray levels.

In accordance with a first aspect of the invention there is provided, an apparatus for processing image data, representing a color separation or mono-color image, the apparatus comprising a processor operative to process the color separation image data or mono-color image data in accordance with first and second or more halftone screen processings at different screen angles and combining the results of the processings to generate composite image data of the first and second or more halftone screen processings.

In accordance with a second aspect of the invention there is provided an apparatus for processing color separation image data representing color separation images for each of plural different colors for printing a multi-color image, the apparatus comprising a screen generator responsive to the color-separation image data for generating halftone screens for each color of the color separation image data, and for one color having color separation image data the screen generator being operative to process color separation image data of said one color in accordance with each of two or more halftone screen angles of different angles and combining the results of the processings with two or more screen angles for output to a printer as composite image data of the two or more screen angles.

In accordance with a third aspect of the invention there is provided a method for processing image data representing a color separation or mono-color image, the method comprising processing the color separation image data or mono-color image data in accordance with first and second or more halftone screen processings at different screen angles and obtaining results of the processings; and combining the results of the processings to generate composite image data of the first and second or more halftone screen processings.

In accordance with a fourth aspect of the invention there is provided a method for processing color separation image data representing color separation images for each of plural different colors for printing a multi-color image, the method comprising processing the color separation image data for generating halftone screens for the color separation images of some of the colors; and for one of the colors processing the color separation image data of the one color in accordance with each of two or more halftone screen angles and combining the results of the processings for output to a printer as composite image data of the two or more screen angles.

In accordance with a fifth aspect of the invention there is provided a method for printing a multi-color image using color separation image data representing color separation images for each of plural different colors, the method comprising processing the color separation image data of each of two different colors and generating similar rosette or diamond structures for each of the two colors and wherein the two colors are complementary colors to each other.

Other objects, advantages, and novel features of the present invention will become more apparent from the following

BRIEF DESCRIPTION OF THE DRAWINGS

FIG. 11 illustrates exemplary three-bit gray halftone dot layouts, according to a full dot type embodiment, as known in the prior art and which may be used in accordance with the invention;

DETAILED DESCRIPTION OF THE PREFERRED EMBODIMENTS

Figure 2:
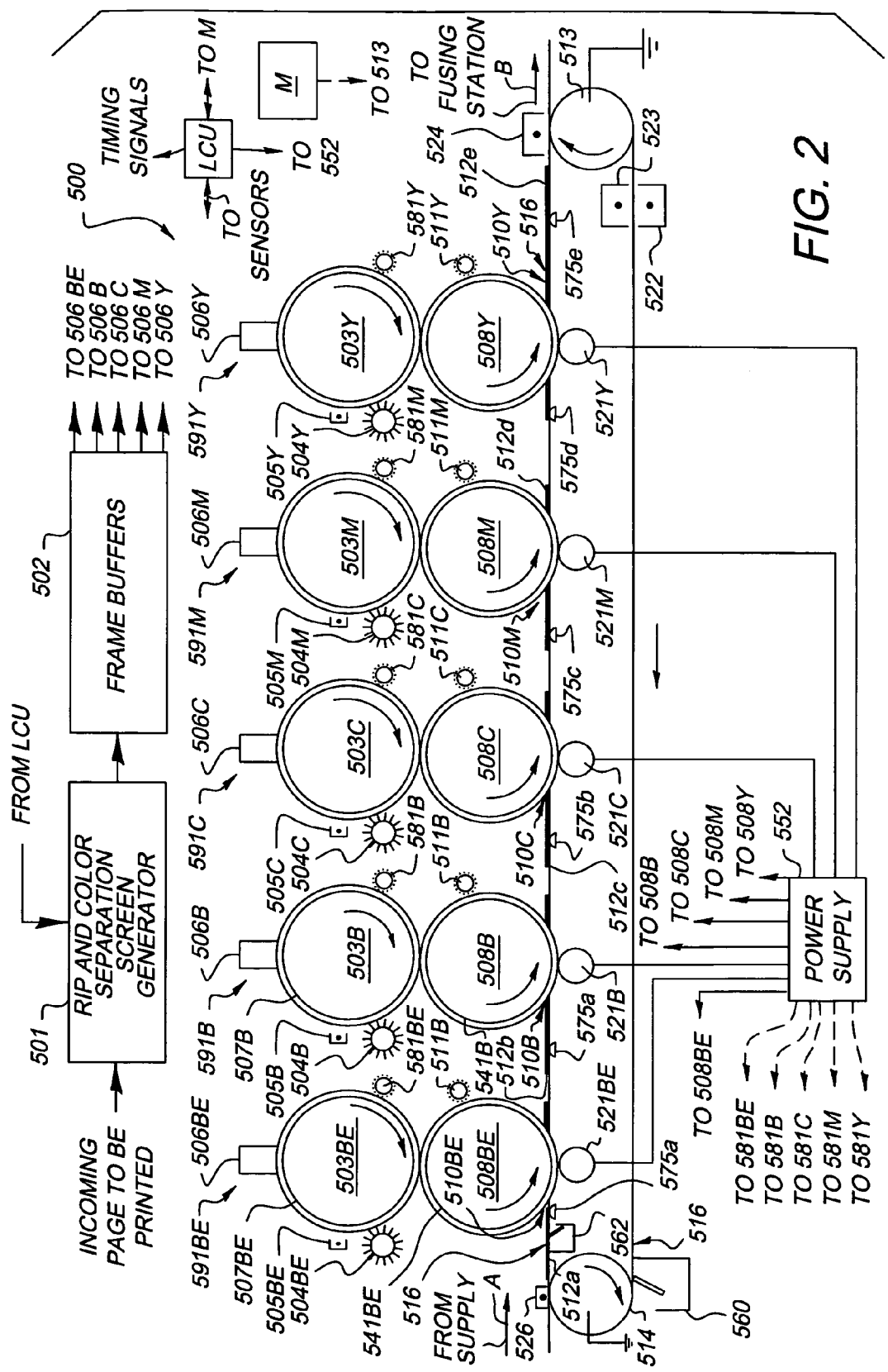
FIG. 2 is a schematic of an electrophotographic print engine that may be used in accordance with the invention to generate multi-color prints.

FIG. 2 is an elevational view showing the essential portions of an electrophotographic engine suitable for printing of full-color images and incorporating the improvements of the invention. Although one embodiment of the invention involves printing using an electrophotographic engine having repeating sets of single-color image producing stations and arranged in a so-called tandem arrangement other electrostatographic color reproduction apparatus and make use of the invention as well as other types of color printing systems including inkjet, lithography, etc.

With reference now to FIG. 2 there is shown a printer apparatus 500 having a number of tandemly arranged electrostatographic image forming modules. Although five-color modules are shown it will be understood that the invention is also suited for multi-color printer apparatus for printing three or more colors. Each module of the printer includes a plurality of electrophotographic imaging subsystems for producing a single-color toned image. Included in each imaging subsystem is a charging subsystem for charging a photoconductive imaging member, an exposure system for image-wise exposing a photoconductive imaging member to form a latent color separation image in the respective color, a development subsystem for toning the image-wise exposed photoconductive imaging member with toner of the respective color, an intermediate transfer subsystem for transferring the respective color separation image from the photoconductive imaging member to an intermediate transfer member and from the intermediate transfer member to a receiver member which receives the respective toned color separation images in superposition to form a composite multi-color image. Subsequent to transfer of the respective color separation images from each of the respective subsystems the receiver member is transferred to a fusing subsystem to fuse the multi-color toner image to the receiver member. Further details regarding the printer 500 are also provided in U.S. Pat. No. 6,608,641, the contents of which are incorporated herein by reference.

The five exemplary color modules of printer apparatus 500 are for preferably forming black, cyan, magenta, yellow, and blue color toner separation images. Although blue is illustrated and preferred as the fifth color it will be understood that the fifth color may be other dominant colors such as red or green or orange or violet or that the number of the modules may be increased to print more colors than five. Elements in FIG. 2 that are similar from module to module have similar reference numerals with a suffix of B, C, M, Y, and BE referring to a color module to which it is respectively associated; i.e. black (B), cyan (C), magenta (M), yellow (Y), and blue (BE). Each module (591B, 591C, 591M, 591Y, and 591BE) is of similar construction except that as shown one receiver transport web (RTW) 516 in the form of an endless belt operates with all the modules and the receiver member is transported by the RTW 516 from module to module. Receiver members are supplied from a paper supply unit, thereafter preferably passing through a paper conditioning unit (not shown) before entering the first module in the direction as indicated by arrow A. The receiver members are adhered to RTW 516 during passage through the modules, either electrostatically or by mechanical devices such as grippers, as is well known. Preferably, receiver members are electrostatically adhered to RTW 516 by depositing electrostatic charges from a charging device, such as for example by using a tack-down corona charger 526. Five receiver members or sheets 512a, 512b, 512c, 512d, and 512e are shown (simultaneously) receiving images from modules 591BE, 591B, 591C, 591M, and 591Y. It will be understood as noted above that each receiver member may receive one color image from each module and that in this example up to five-color images can be received by each receiver member. The movements of the receiver member with the RTW 516 is such that each color image transferred to the receiver member at the transfer nip 510B, 510C, 510M, 510Y, and 510BE of each module is a transfer that is registered with the previous color transfer so that a five-color image formed on the receiver member has the colors in registered superposed relationship on the transferee surface of the receiver member. The receiver members are then serially detacked from RTW 516 and sent in a direction indicated by arrow B to a fusing station (not shown) to fuse or fix the dry toner images to the receiver member. The RTW is reconditioned for reuse by providing charge to both surfaces using, for example, opposed corona chargers is 522, 523 which neutralize charge on the two surfaces of the RTW.

Each color module includes a primary image-forming member, for example a drum or primary image-forming roller (PIFR) labeled 503B, 503C, 503M, 503Y, and 503BE respectively. Each PIFR 503B, 503C, 503M, 503Y, and 503BE has a respective photoconductive surface structure 507B, 507C, 507M, 507Y, and 507BE having one or more layers, upon which a pigmented marking particle image or a series of different ones of such images is formed (individual layers of PIFRs are not shown). In order to form toned images, the outer surface of the PIFR is uniformly charged by a primary charger such as a corona charging device 505B, 505C, 505M, 505Y, and 505BE respectively, or by other suitable charger such as a roller charger, a brush charger, etc. The uniformly charged surface is preferably exposed by a respective electronic image writer, which exposure device is preferably an LED or other electro-optical exposure device, for example, a laser to selectively alter the charge on the surface of the PIFR. The exposure device creates an electrostatic image corresponding to an image to be reproduced or generated. The electrostatic image is developed, preferably using the well-known discharged area development technique, by application of pigmented marking particles to the latent image bearing photoconductive drum by development station 581B, 581C, 581M, 581Y, and 581BE respectively, which development station preferably employs so-called "SPD"(Small Particle Development) developers. Each of development stations 581B, 581C, 581M, 581Y, and 581BE is respectively electrically biased by a suitable respective voltage to develop the respective latent image, which voltage may be supplied by a power supply, e.g., power supply 552, or by individual power supplies (not illustrated). The respective developer includes toner marking particles and magnetic carrier particles. Each development station has a particular color of pigmented toner marking particles associated respectively therewith for toning. Thus, each module creates a series of different color marking particle images on the respective photographic drum. In lieu of a photoconductive drum, which is preferred, a photoconductive belt may be used. Alternatively, the image may be created by an electrostatic charger that forms respective pixels of charge on an insulating surface directly in response to image information.

Each marking particle image formed on a respective PIFR is transferred to a compliant surface of a respective secondary or intermediate image transfer member, for example an intermediate transfer Roller (ITR) labeled 508B, 508C, 508M, 508Y, and 508BE respectively. After transfer, the residual toner image is cleaned from the surface of the photoconductive drum by a suitable cleaning device 504B, 504C, 504M, 504Y, and 504BE, respectively, so as to prepare the surface for reuse for forming subsequent toner images.

A logic and control unit (LCU) provides various control signals that control movement of the various members and the timing thereof as well as the appropriate electrical biases for accommodating the various transfers of the respective toner images. Timing signals are also provided to a motor M, which drives a drive roller 513 that drives the RTW 516. The RTW in turn may be used to drive the other components and/or other drivers may be used to control movement of the rollers in the respective modules. Image data for writing by the printer apparatus 500 may be processed by a raster image processor (RIP) 501 which may include a color separations screen generator or generators. The term "generator" or "generators" are used interchangeably herein since a single device may operate serially and be programmed or adjusted to operate differently for each of the different screens. The output of the RIP may be stored in a frame or line buffers 502 for transmission of the color separation print data to each of the respective LED writers 506 BE, 506B, 506C, 506M, and 506Y. The RIP and/or color separations screen generator may be a part of the printer apparatus or remote therefrom. Image data processed by the RIP may be obtained from a color document scanner or a digital camera or generated by a computer or from a memory or network which typically includes image data representing a continuous image that needs to be reprocessed into halftone image data in order to be adequately represented by the printer. The RIP may perform image processing processes including color correction, etc. in order to obtain the desired color print. Color image data is separated into the respective colors and converted by the RIP to halftone dot image data in the respective color using threshold matrices, which comprise desired screen angles and screen rulings. The RIP may be a suitably programmed computer and/or logic devices and is adapted to employ stored or generated threshold matrices and templates for processing separated color image data into rendered image data in the form of halftone information suitable for printing.

Figure 24:
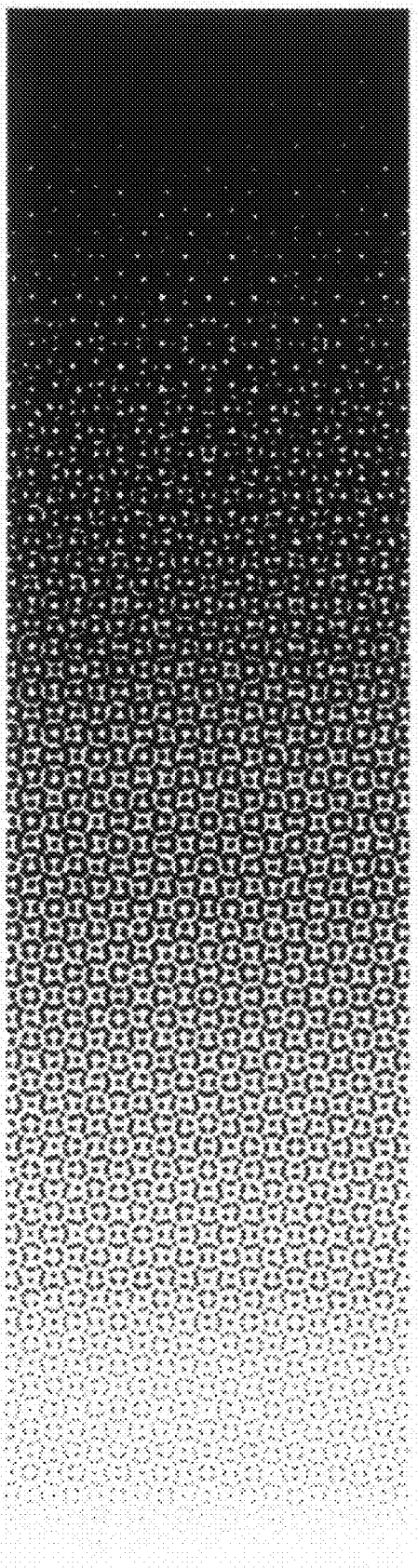
FIG. 24 is an illustration of a rosette density ramp resulting from the use of two or more halftone screens at different screen angles to generate the halftone color separation image of one color in accordance with the invention.
Figure 25:
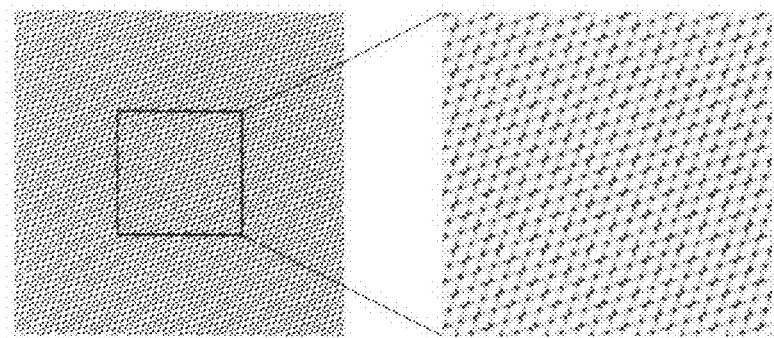
FIG. 25 is an illustration of a diamond screen structure formed by the use of two halftone screens at 60° screen angle to generate the halftone color separation image of one color using a line structure dot growth pattern in accordance with the invention.

The invention proceeds from the recognition that a visually pleasing rosette structure is formed when the individual screen orientation angles are spaced 30° apart. The traditional graphics are printing practice is of using 15°/45°/75° angle screens designed to form a balanced cyan, magenta, and black (CMK) rosette structure. In the CMYK four-color printing process, the yellow screen is usually designed at 0° or 45°. However, a moiré pattern resulting from the interaction of the yellow screen with the other three individual screens is not as visually pleasing as a 30° moiré pattern (rosette structure). Yellow is a light color, so this additional moiré is usually acceptable and difficult to notice in the conventional CMYK four-color printing practice. However, with careful examination, this yellow moiré pattern may show up in certain composite colors. The invention therefore proposes that a design of a rosette structure screen for the yellow color may be provided that eliminates the unpleasant moiré pattern caused by the interaction of the yellow screen with the other three screens (C, M, and K). The rosette structure is formed when two or more differently oriented screens are overlaid on top of each other. This rosette structure carries frequency information corresponding to multiple screen rulings and multiple screen angles that diffuse the spectrum into broad distribution instead of sharp peaks that occur in the regular halftone structure. The rosette structure hides the screen structure so that it is less visible to the naked eye and looks smooth even when printed in a single separation color. In the description below reference will be made to separate color separation images of the same color being at different screen angles, however as will be shown with reference to the flowchart of FIG. 27 that a composite of the two screens may be combined electronically before printing and this composite then printed. An illustration of a density ramp for such a rosette structure is illustrated in FIG. 24.

Figure 23:
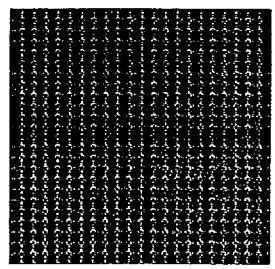
Figure 3:
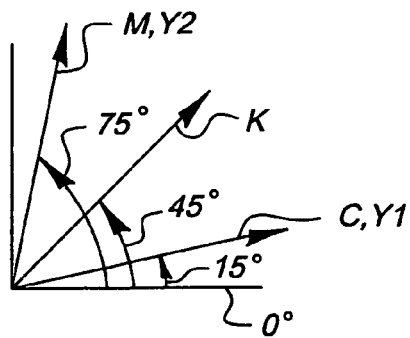
FIGS. 3-6 are respective different diagrams each illustrating a representation of halftone screen angles in a four-color printing system in accordance with four different embodiments of the invention wherein the color yellow is represented by two or more halftone screens at different screen angles.

With reference now to FIG. 3 there is illustrated a first embodiment of the invention wherein a four-color halftone system is shown in accordance with their respective color screen angles. In each of the color systems to be hereafter described it is assumed that a print job request is for a photographic type of image (as opposed to a text image) and each module of printer apparatus 500 will be caused to generate a halftone screened image in the respective separation color and wherein the cells of the halftone screen are oriented at the angle indicated in the respective figure. The cyan color separation component halftone screen is directed at the same screen angle of 15° as that of a first yellow color halftone separation screen Y1. The black color (K) separation component halftone screen is directed at the usual angle of 45°. The magenta color separation component halftone screen is directed at the usual angle of 75° as is that of a second yellow color halftone separation screen Y2. A rosette structure developed by the two 15°/75° yellow halftone screens is illustrated in FIG. 23.

Figure 22:
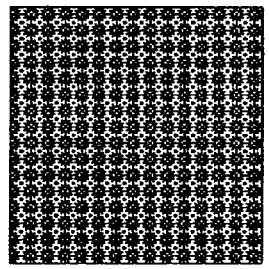
FIGS. 22 and 23 are each respective illustrations of rosettes resulting from the use of two halftone screens at the indicated two different screen angles to generate the halftone color separation image of one color in accordance with the invention.
Figure 4:
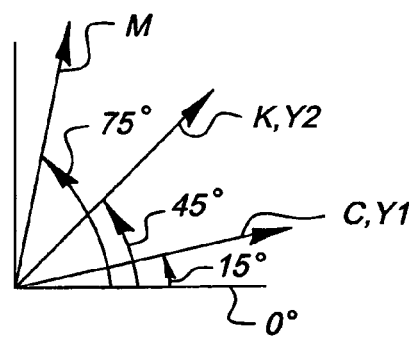
Figure 5:
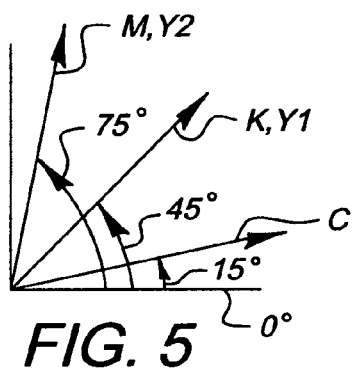

With reference now to FIGS. 4 and 5 there are illustrated second and third embodiments of the invention wherein a four-color halftone screen system has the cyan, black and magenta halftone screens oriented at the usual angles of 15°/45°/75°. In each of these embodiments the two yellow screens, Y1 and Y2, are oriented at angles of 15° and 45° (FIG. 4) and angles 45° and 75° (FIG. 5), respectively. A rosette structure corresponding to the two screen angles for the yellow color separation image of FIG. 4 is illustrated in FIG. 22.

Figure 1:
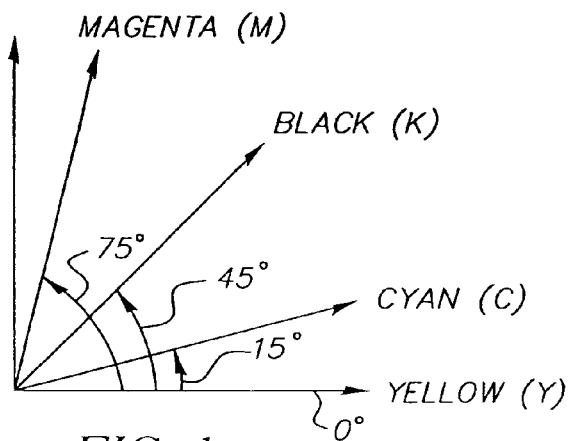
FIG. 1 is a diagram illustrating a representation of halftone screen angles in a four-color printing system as known in the prior art.
Figure 21:
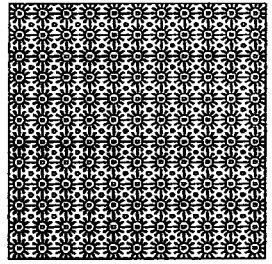
FIG. 21 is an illustration of a rosette resulting from the use of three halftone screens at three different screen angles to generate the halftone color separation image of one color in accordance with the invention.
Figure 6:
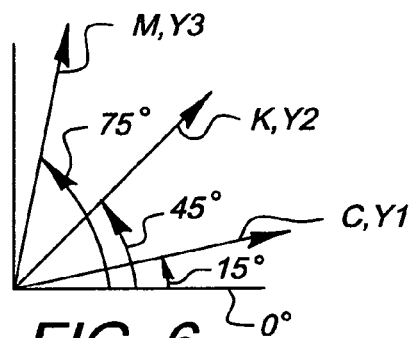

With reference now to FIG. 6 there is illustrated a fourth embodiment of the invention wherein a four-color halftone screen system has the cyan, black and magenta halftone screens oriented at the usual angles of 15°/45°/75°. In this embodiment there are three yellow halftone screens, Y1, Y2, and Y3 that are oriented respectively at the screen angles of 15°/45°/75°. The rosette structure corresponding to the three screen angles for the yellow color separation image of FIG. 6 is illustrated in FIG. 21.

Figure 7:
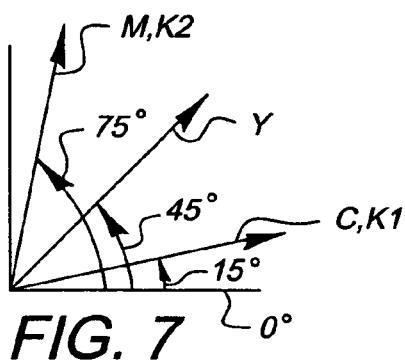
FIGS. 7-10 are respective different diagrams each illustrating a representation of halftone screen angles in a four-color printing system in accordance with four different embodiments of the invention wherein the color black is represented by two or more halftone screens at different screen angles.
Figure 8:
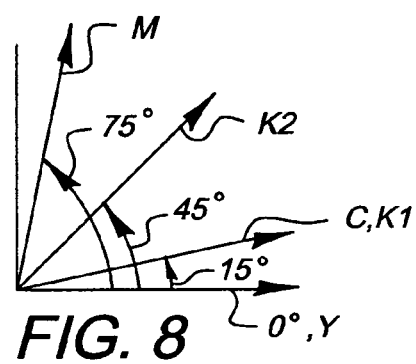
Figure 9:
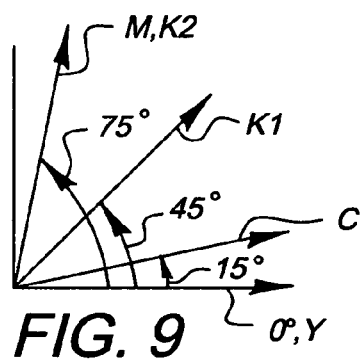
Figure 10:
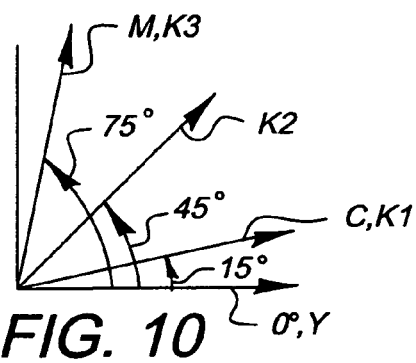

With reference now to FIGS. 7-10 there are illustrated fifth, sixth, seventh, and eighth embodiments of the invention wherein a four-color halftone screen system has one of the dominant colors such as black which will be formed as a composite of two or three halftone screens at different screen angles. In all the embodiments of FIGS. 7-10 the cyan and magenta halftone screens are oriented at the usual angles of 15°/75°. In FIG. 7 the yellow color halftone separation is at an angle of 45°. As noted above, yellow is typically located at either one of 0° or 45°. In the embodiment of FIG. 7 the two black halftone screens, K1 and K2, are at angles of 15° and 75°, respectively. The rosette structure for the black color for this embodiment is also illustrated in FIG. 23. In the embodiments of FIGS. 8, 9 and 10 the yellow halftone screen is formed at 0°. In the embodiment of FIG. 8 the two black halftone screens, K1 and K2, are at 15° and 45°, respectively. The rosette structure for the black color for the embodiment of FIG. 8 is illustrated in FIG. 22. In the embodiment of FIG. 9 the two black halftone screens are at 45° and 75°, respectively. In the embodiment of FIG. 10 there are three black halftone screens, K1-K3, at the screen angles of 15°/45°/75°. The rosette structure corresponding to the three screen angles for the black color separation image of FIG. 10 is also illustrated in FIG. 21.

Figures 12, 13:
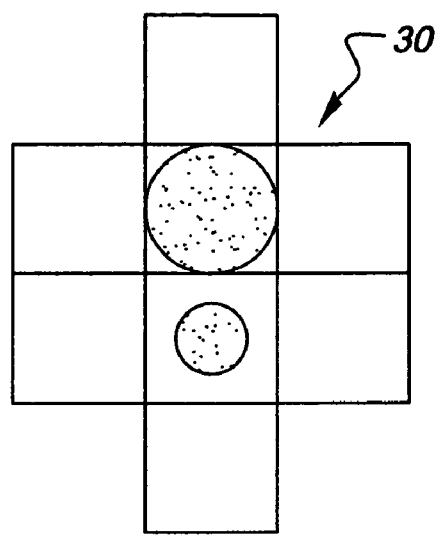
FIG. 12 illustrates a halftone cell with dots that have been formed in accordance with the full dot type of growth pattern of FIG. 11.
FIG. 13 illustrates an exemplary halftone dot mask used for growing the full type dot type of FIG. 11.
Figure 14:
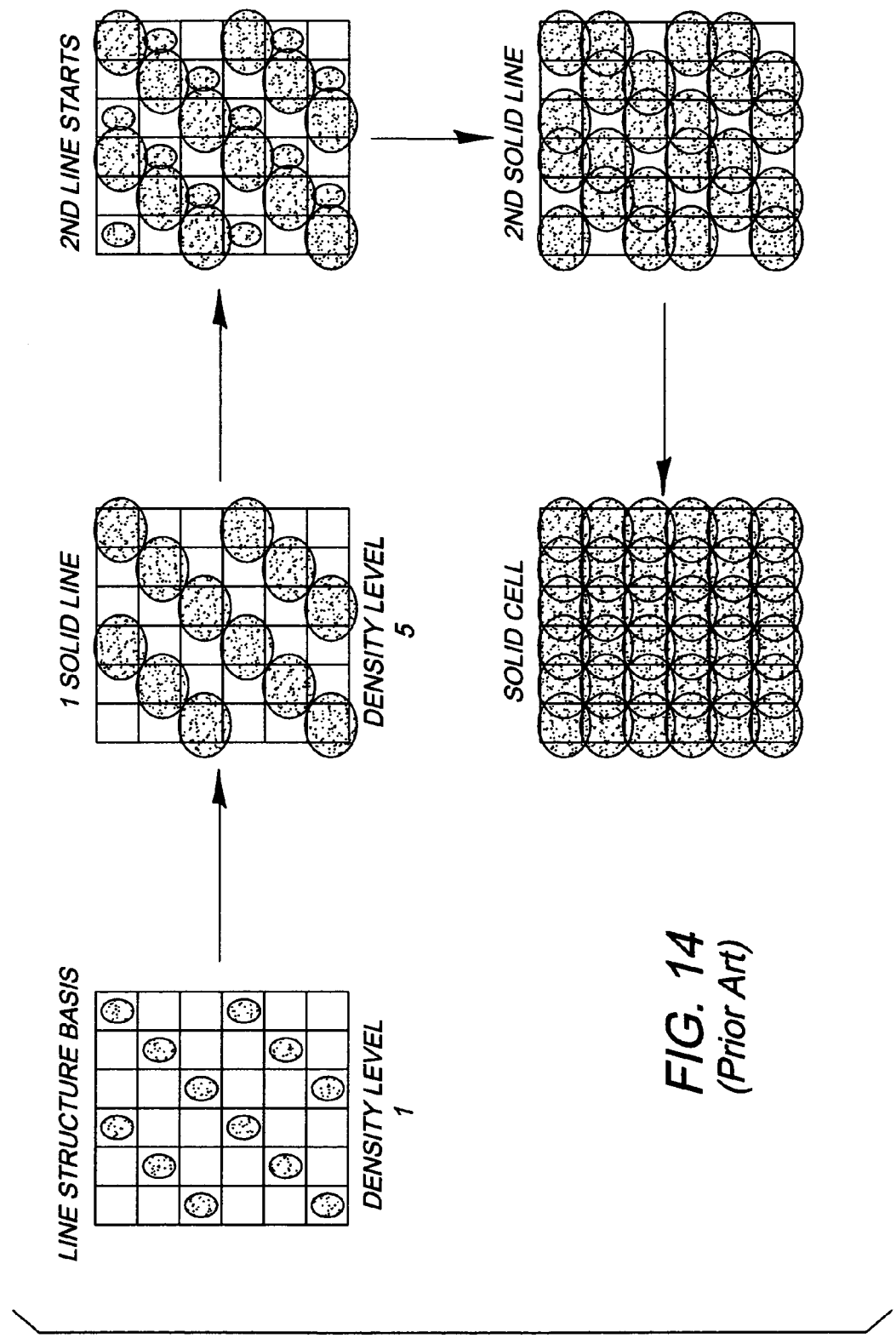
FIG. 14 is a graphic illustration of the building up within a halftone cell in accordance with a line type dot growth pattern as known in the prior art and which may be used in accordance with the invention.

With reference now to FIGS. 11-13 description will be provided of a dot structure dot growth pattern, which is distinguished herein from the line structure dot growth pattern description of which will be provided hereafter with regard to discussion of FIG. 14. It should be understood that while the preferred embodiments described herein utilize gray level printheads that are adapted to print gray level dots at each pixel location that the invention regarding the use of various screen angles and dot types are also suited for binary printheads that can place either a dot or no dot at a particular pixel location in a halftone cell. As noted above the pixel locations are grouped into cells having cell gray levels. The dots of a cell are formed such that for each increase in cell gray level, a dot at at least one of the pixels in the cell, the core pixel, forms to a larger dot size (or dot density). In an example of one type of growth pattern the dots are sequentially formed at the pixels in the cell in a pre-defined order such that at the lower cell gray levels a dot is formed at a first or core pixel location within the cell and this dot is increased in size (or density) with desired increases in cell density until a maximum dot size is reached before beginning the formation of a dot at an adjacent pixel location within the cell. Thereafter for increasing cell gray levels the dot size is increased at this adjacent pixel location until a maximum dot size is reached at the pixel location. Additional increases in cell density are made similarly with buildup of dots using adjacent pixel locations so that dot growth is from a center or core pixel location gradually outwardly and surrounding the central pixel location. Alternatively, the growth pattern for the dots of the halftone cell may be a "partial dot" dot structure dot growth pattern also described in aforementioned U.S. Pat. No. 5,258,849, the contents of which are incorporated herein by reference.

In lieu of the "full dot" dot growth pattern and the "partial dot" dot growth pattern just described as well as described in U.S. Pat. No. 5,258,849, the growth pattern may also be that which is known as a "mixed dot" dot structure dot growth pattern wherein growth of the dot at a core pixel location is to a predetermined level less than a maximum before commencing growth at one or more adjacent pixel locations about the core pixel. Subsequent growth is by additions to the core pixel as well as to the one or more adjacent pixel locations.

With reference to FIG. 11 there is illustrated an example of a 3-bits/pixel gray halftone dot layout for a full dot type growth pattern. Also illustrated are seven different pixel dot sizes corresponding to the sizes that each individual pixel dot can obtain. There are 57 possible gray levels for the exemplary aid elements sell 30 shown here. An example of the formation of the cell that is a gray level 12, will now be given.

The pixel circled in level one, reference numeral 1, is formed to dot size 1 in level 1. Only one cell will be described, although the pixels in other cells will be changed according to the same layout or growth pattern as shown in FIG. 11. The dot at this pixel grows larger and larger as cell gray levels increase from level 1 to level 2 all the way to cell gray level 7. One can see that the circled pixel increases in value from pixel size (or density) 1 to 7 as the cell gray levels increase. If the desired gray level for the cell 30 is 7, then the formation of dots would be completed once the circled pixel has reached the dot size of 7. In this example, however, the gray level for the cell 30 is desired to be 12. At gray level 7, the circled pixel has reached its maximum dot size, so that a dot at another pixel location in the cell must now start forming. This dot starts forming at an adjacent pixel indicated with a square around it in level 1, with the numeral 8.

The dot formation process continues, with the dot at the second pixel growing larger and larger as the levels again increase from level 1 to level 5. The formation process stops at level 5, since the pixel has now reached the value of 12. The halftone cell 30 now contains, as seen in FIG. 12, a dot of dot size 7, and a dot of dot size 5. The extension of this formation process to 57 gray levels is easy to see from this example. Although this example is illustrated with a printer that forms dots in accordance with 3-bits/pixel the invention is suited for use with any gray level printhead that can form pixels at 2 bits/pixel or more as well as with binary printheads wherein the dot growth pattern is around a central or core pixel location.

The full dot type process thus involves forming dots at the highest priority pixels to their maximum allowable dot size before beginning the formation of the dots for the next highest priority pixels. An exemplary halftone dot mask 32 with pixel priorities indicated is shown in FIG. 13. Different matrix sizes, cell shapes, and priorities can be used for the cells than that illustrated in FIG. 11. Halftone cells of about 4×4 pixels are known and may be used it being understood that the average number of pixels per cell need not be a whole number.

In the electrophotographic process, the full dot type formation process is favored because it forms stable dots and exhibits less granularity (halftone printing noise). The partial dot type is known to carry more information detail than full dot but at the cost of less stable dots in the electrophotographic process. The mixed dot type combines the merits of both the full dot and the partial dot types in gray level halftoning. The above description of the 3-bits/pixel printhead case, may readily be extended to higher numbers of gray levels. In an example of a 4-bits/pixel printhead, each pixel location in the cell may have gray levels from 0 to 15. Also in an example of an 8 bits/pixel printhead each pixel location in the cell may have gray levels from 0 to 255 and the resolution of the printer for printing pixels may be 300 dpi or greater, the example of FIG. 2 being a 600 dpi printer. In the embodiments of FIGS. 3-10 the halftone cells for all the halftone color separation images are grown in density using a dot structure dot growth pattern wherein density increases in the halftone cell are about a central or core dot.

With reference now to FIG. 14 and with further reference to U.S. Pat. No. 5,258,850 there is shown a halftone cell wherein the growth pattern of the dots within the cell is a development or creation along a line or lines as opposed to growing of dots about a central or core dot. In the line structure dot growth pattern for lower values of cell density, for example from cell density level 1 to cell density 5, all the pixel locations indicated as having a dot are exposed to form a line of dots or a series dot lines (three dot lines are shown in the FIG. 14). As the lines become solid dot lines due to overlap of adjacent dots as the dots grow in size at the pixel locations along the dot lines further increases in cell density are produced by forming secondary lines adjacent each of the solid lines as shown in the FIG. 14. Thus it can be seen that the line structure dot growth pattern emphasizes creation of stable line structures as opposed to the full or partial or mixed dot type growth structure, which emphasizes stable dot growth.

Figure 15:
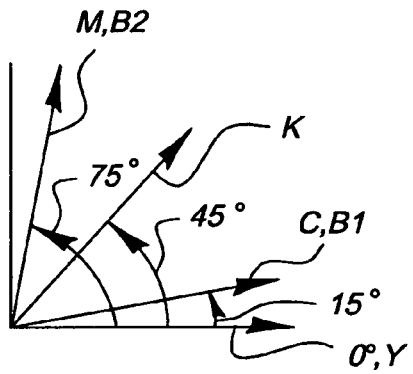
FIGS. 15-20 are respective different diagrams each illustrating a representation of halftone screen angles in a five-color printing system, typically referred to as a hi-fi color printing system, in accordance with ten different embodiments of the invention wherein the hi-fi color is represented by two or more halftone screens at different screen angles.
Figure 16:
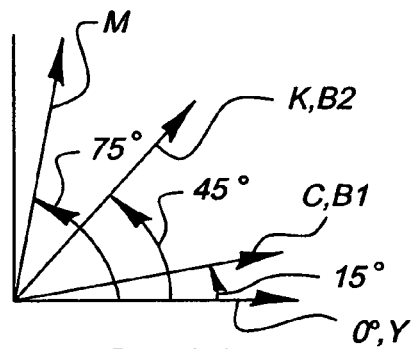
Figure 17:
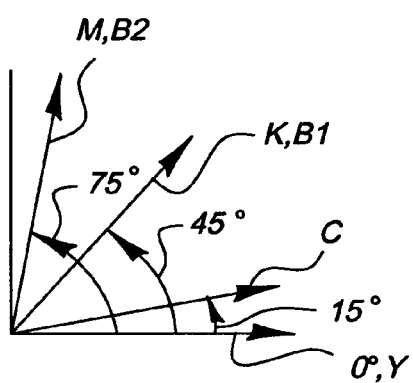
Figure 18:
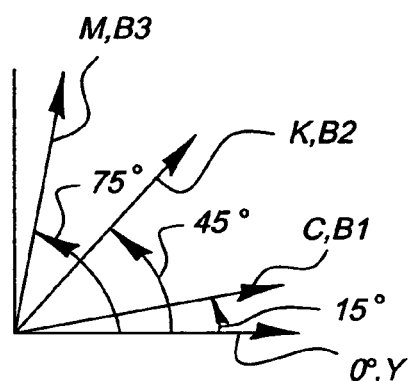

With reference now to FIGS. 15-18, there are illustrated the ninth through twelfth embodiments of the invention wherein five colors are accommodated, i.e. a hi-fi color system. For example red, green, blue, orange, or violet color may be the fifth color in a hi-fi color system. In these embodiments for the colors yellow, cyan, black, magenta, the halftone cells are at the usual angles 0°, 15°, 45°, and 75° respectively. The hi-fi color, in this example blue (B), is formed of at least two halftone screens at different respective angles: In the embodiment of FIG. 15 the blue halftone cells (B1 and B2) are at the angles of 15° and 75° respectively. The rosette structure formed by a composite of such screens is also illustrated in FIG. 23. In the embodiment of FIG. 16 the blue halftone cells are at the angles of 15° and 45° and the rosette structure formed by a composite of such screens is also illustrated in FIG. 22. In the embodiment of FIG. 17 the blue halftone cells are at the screen angles of 45° and 75° and a rosette structure is formed by a composite of such screens. In the embodiment of FIG. 18 there are three blue halftone cells that are employed to create the blue color separation image. In the embodiment of FIG. 18 the blue halftone cells (B1, B2, and B3) are at the screen angles of 15°, 45°, and 75° respectively and the rosette structure formed by a composite of such three screens is also illustrated in FIG. 21.

In additional alternate embodiments of the invention five colors are accommodated; i.e. a hi-fi color system, except that the hi-fi color and its complementary color are each formed using the same rosette structure. For example, blue and yellow can each be formed using two halftone screen angles with the identical angles, i.e. 15° and 75° and identical screen frequencies and identical type of dot growth pattern such as the dot structure dot growth pattern or a line structure dot growth pattern. The color separation images of cyan, magenta, and black are processed at halftone screen angles typical for these colors. Where the hi-fi color is green its complementary color is magenta and both the green and magenta color separation images may be processed identically using the same number of halftone screen angles (two or three), the identical screen frequencies and identical type of dot growth pattern. Thus, in other examples, the blue color screen angles shown (B1, B2, and B3) could be replaced by a green color (G1, G2, and G3), and the yellow color (Y1, Y2, and Y3) could be changed to magenta color (M1, M2, and M3), so that the same rosette screen can be applied to both complementary colors (green and magenta) in a hi-fi color printing system where cyan, yellow, and the black color have the original screen angles shown in FIGS. 15-18. Similarly, if the hi-fi color is red its complementary color is cyan, and both the red and cyan color separation images may be processed identically using the same plural number of halftone screen angles, the identical screen frequencies and identical type of dot growth pattern to obtain the same rosette or diamond structure for each as described for blue and yellow. It will be understood that a four-color system may also be a hi-fi color system wherein cyan, magenta and yellow are used in combination with another color other than black and the other color may be a complementary color of one of cyan, magenta or yellow.

Placement of the blue screen at an angle of only 15° from cyan and magenta with all three colors being dominant colors may cause a problem in printing quality. However, where the blue screen is formed in a rosette structure as described herein the problem can be ameliorated. Furthermore, this can be extended to other hi-fi colors so that it is acceptable to use a rosette structure in forming other hi-fi colors as red and green in a hi-fi color printing system. Preferably, where red is the hi-fi color and formed in a rosette pattern, its complement, which is cyan will also be formed in a rosette pattern such as illustrated in FIGS. 21-23 and 25 with red and cyan being processed identically using the same screen angles (two or three angles) and screen frequencies. Similarly, green and its complement magenta can also each be processed to form respective rosette structures. Because there are seldom images having both complementary colors present on the same pixel, lay down of complementary colors on the same pixel produces a gray color which can be replaced at least in part by a black color during printing.

In the embodiments of FIGS. 15-18 the halftone cells for all the halftone color separation images are grown in density using a dot structure dot growth pattern wherein density increases in the halftone cell are about a central or core dot. However, it will be understood that the dot growth pattern for the colors other than blue may have instead a line structure dot growth pattern. In this regard it is preferred to have pairs of colors being formed in a line structure dot growth pattern. The rosette structures illustrated in FIGS. 21-23 result from processing of the image data for the color blue (or any single-color separation image or mono-color) using halftone cells having a same dot structure dot growth pattern. As an alternative, a color separation image that is formed using two halftone screen angles can be formed using a line structure dot growth pattern and advantageously one color color-separation image and its complementary color color-separation image can each be formed with the identical diamond structure as described herein.

Figure 19:
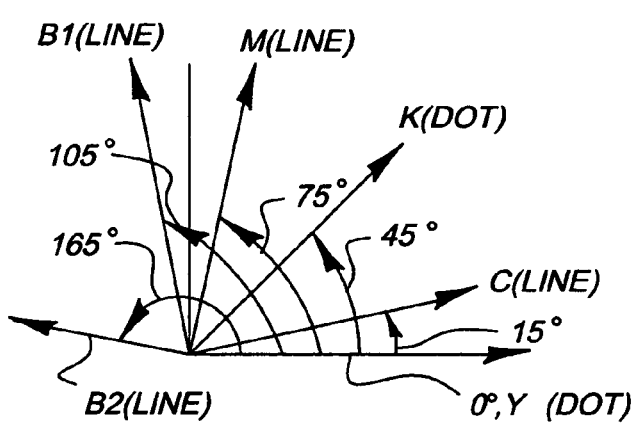
Figure 26:
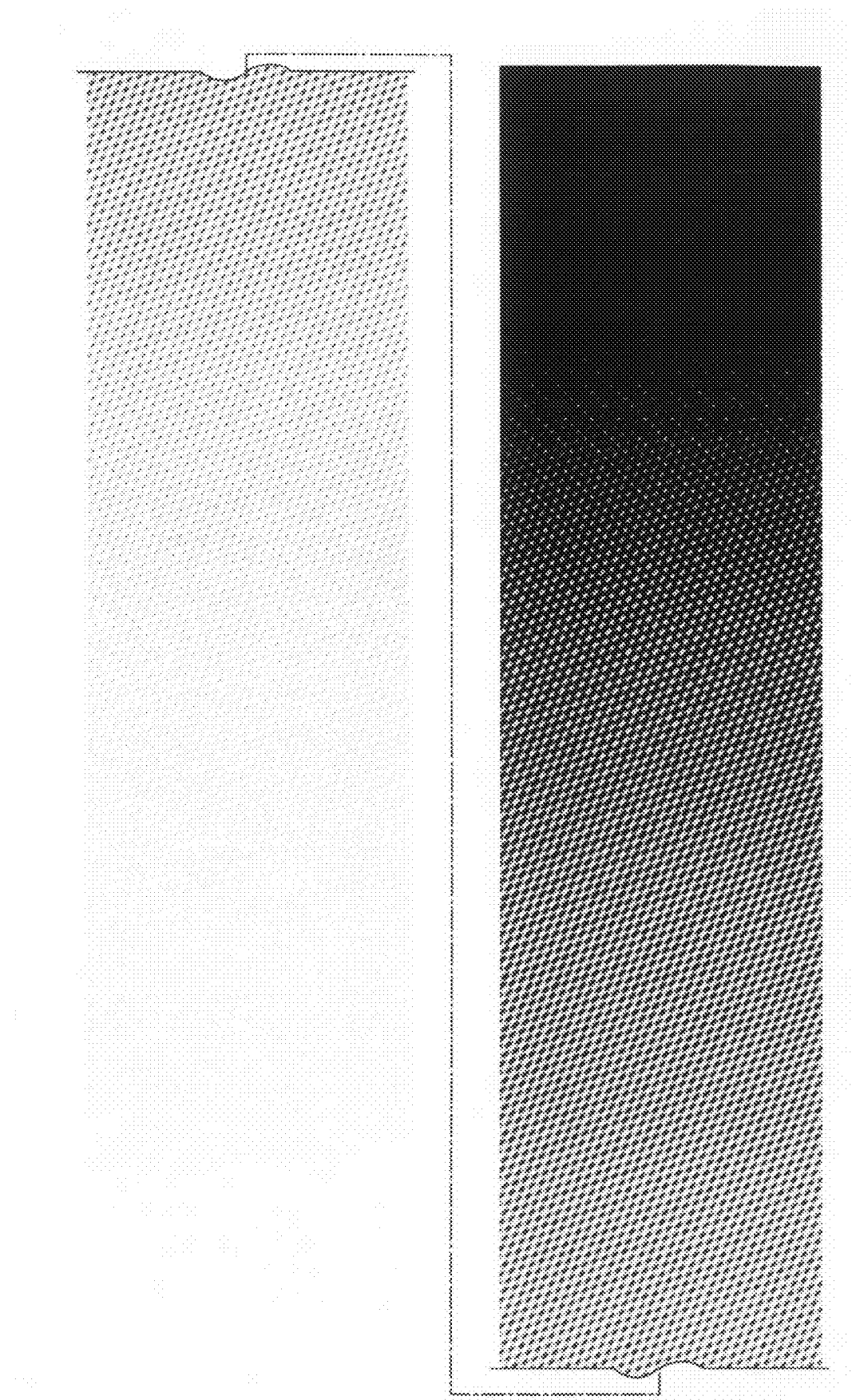
FIG. 26 is an illustration of a density ramp with use of the diamond screen structure of FIG. 25.

With reference now to FIG. 19 there is illustrated the seventeenth embodiment of the invention wherein five colors are accommodated. The halftone screens for the yellow and black color separations are situated at 0° and 45° respectively and each of these screens employs a dot structure dot growth pattern. The cyan and magenta color separation images have their respective halftone screens at angles of 15° and 75° respectively and each of these halftone screens employs a line structure dot growth pattern. A 60° line structure is thus formed by, the cyan and magenta color separation images, and this 60° rosette or diamond line structure is relatively pleasing. Furthermore, the blue color separation image is formed using a composite of two halftone screens, one being situated at 105° and the other at 165° to provide a 60° separation between the two screens. Both of these blue color separation halftone screens also employ a line structure dot growth pattern. It will be noted that, in the embodiment of FIG. 19, the line structures formed as a result of the B1 halftone cell will be perpendicular to that of the line structures formed in the cyan halftone color separation and the line structures formed as a result of the B2 halftone cell will be perpendicular to that of the line structures formed in the magenta color separation. Therefore, objectionable moiré pattern artifacts will tend to be minimized. Because the halftone screens B1 and B2 are separated by 60° and provided with line structure dot growth patterns the two directions respectively orthogonal to these lines are separated by a 60° angle and also combine to form a "double line" screen in cyan and magenta the white holes of which have a diamond shape, see in this regard the diamond screen pattern shown in FIG. 25. In FIG. 26 there is illustrated a density ramp of the composite "double line" screen with the diamond structure formed by the composite of halftone screens B1 and B2.

Figure 20:
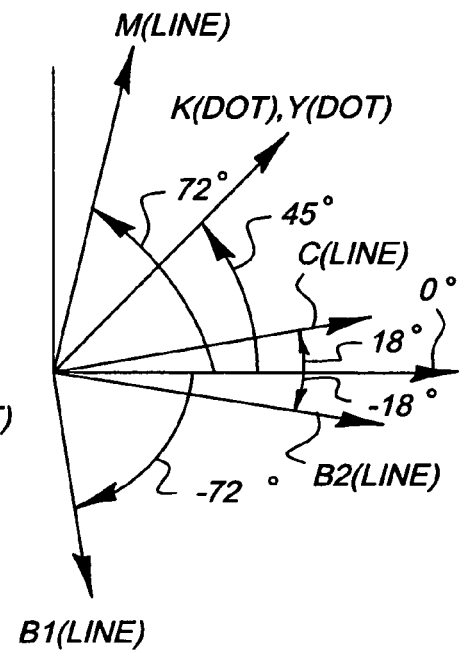

With reference to FIG. 20 there is illustrated an eighteenth embodiment of the invention wherein five colors are accommodated. The halftone screens of yellow and black are both situated at 45° and both of these screens employ a dot structure dot growth pattern. The cyan and magenta halftone screens are at 18° and 72° respectively and both of these screens employ a line structure dot growth pattern. The blue color separation image is formed using a composite of two halftone screens, one at −18° and the other at −72°, and in accordance with the process illustrated by the flowchart of FIG. 27 each using the line structure dot growth pattern to form the diamond line structure illustrated by FIGS. 25 and 26.

Figure 27:
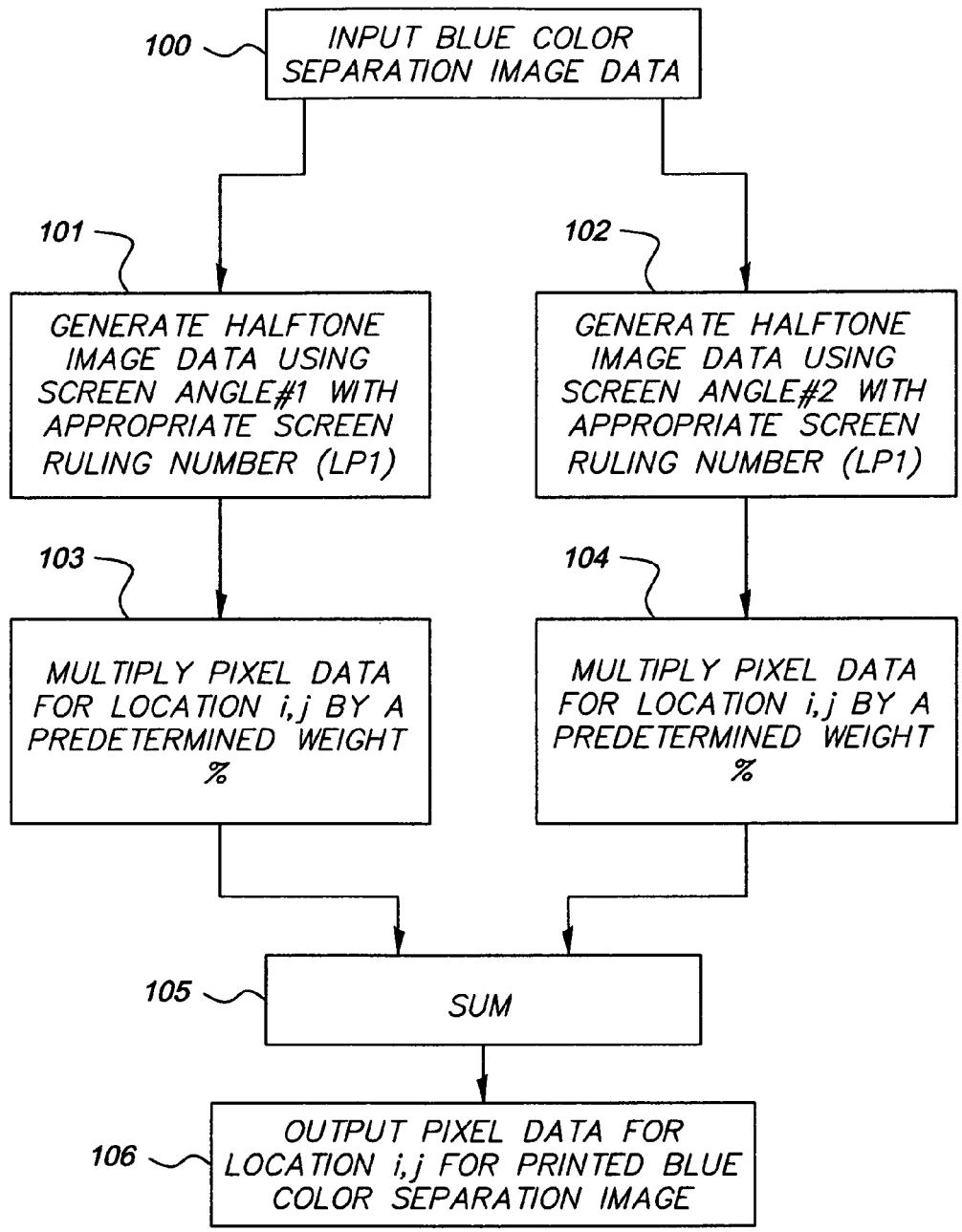
FIG. 27 is a flowchart for creating a single-color separation image using two halftone screens at two different screen angles.

With reference to the flowchart of FIG. 27 the actual image that is printed for the blue color separation of the embodiments of FIGS. 15-20 (or of the two yellow halftone screens for the embodiments of FIGS. 3-6 or of the two black halftone screens for the embodiments of FIGS. 7-10) is a composite weighted sum of corresponding pixel locations in each of these two blue (or two yellow, or two black, etc.) color separation screens. Thus as can be seen in the flowchart of FIG. 26 color image data of the blue color separation image (or any color separation image or a mono-color) is input from a color scanner, digital camera, memory or computer or generated from some other combination of colors and may be subject to color correction and other corrections to make the image data color dependent on the characteristics of the printer, step 100. The corrected blue color separation image data is processed by the screen generator or respective generators, at each of the two different halftone screen angles, steps 101 and 102. To do this, threshold values are assigned with each screen and associated with each halftone cell and dependent upon line frequency, dot growth pattern type, halftone cell size, etc., the incoming blue image data is compared with the threshold values to determine whether or not a dot is to be printed at a particular pixel location i,j (binary printing case) or to determine the gray level of the dot at a particular pixel location i,j (gray level printing case). The algorithmically developed gray value for each pixel location i,j is then multiplied by a predetermined weighting value, steps 103, 104, and then the weighted products are summed in step 105. The sum in step 105 represents the rendered pixel value to be sent to the printer for printing by that color module at the pixel location i,j on the receiver sheet, step 106. Further modification of the pixel value may be made for uniformity correction or otherwise as is well known in the art. The resulting image produced has an influence of both screens so that there are a series of dot structures or line structures that appear to be printed along lines at one screen angle and other series of dot structures or line structures that appear to be printed along lines at the second screen angle. In the examples where all the halftone cells for the blue (or any color separation image or mono-color) image provide a dot structure dot growth pattern the rosettes of FIGS. 21-23 will be created and appear relatively pleasing. In the examples where all the halftone cells for the blue (or any color separation or mono-color) image provide a line structure dot growth pattern the diamond screen pattern of FIG. 25 will be created and appear relatively pleasing.

Halftone cells comprising the halftone screens form, in response to the image data, a buildup of halftone dots at various locations on each halftone screen wherein the dots appear to be arranged along lines having different respective angles. It will be noted that while each cell comprises plural pixel locations that it is the cell itself that is to be representative of the gray level to be printed at an area on the receiver member. Each halftone screen 101, 102 has a counterpart pixel location that would ordinarily be used to print a pixel at a pixel location i,j on the receiver. The counterpart pixel in each halftone screen is multiplied by a weighting factor associated with each screen and then the sum is taken and sent to the printer for printing at that pixel location i,j on the receiver member. The composite image thus formed for this blue color separation represents pixels arranged along two screen line directions that in effect present a rosette or diamond grid. In the case of where the hi-fi color (or any color separation or mono-color) is rendered using a composite of two halftone screens that employ the line structure dot growth pattern a diamond structured grid pattern having the density ramp of FIG. 26 will result.

Figure 28:
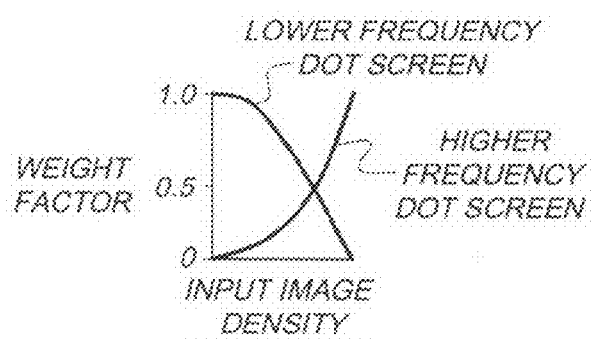
FIGS. 28-30 are graphs illustrating examples of determination of weight factors for use in the flowchart of FIG. 27.
Figure 29:
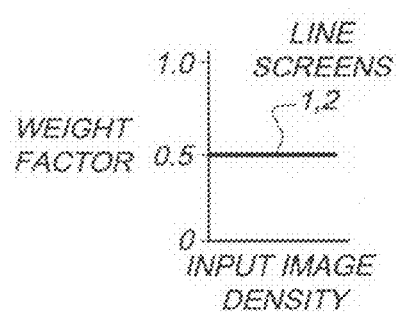
Figure 30:
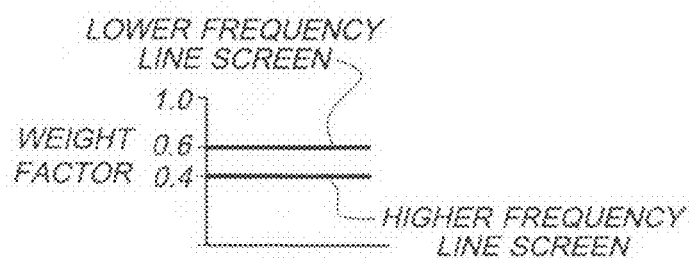

It has been found that this 60° diamond grid has a relatively pleasing appearance and is the preferred angle for a diamond grid. However, diamond grid angles of 53° to 64° are also appealing. The weighting factors provided when forming the composite of the halftone screens 101, 102 may be adjusted in accordance with providing more weight to one than the other to emphasize one screen angle over the other at certain densities. With reference to FIGS. 28-30 there are illustrated various examples of how a weighting factor implementation might be realized. In the example where a line structure dot growth pattern is employed for a color being produced using the combined processing of two halftone screens at different screen angles the preferred weighting factors to employ is, as shown in FIG. 29, 0.5 for each halftone screen and preferably these screens are of the same screen frequency. However, as noted in FIG. 30 greater weight may be provided to a lower frequency line screen in an example where one color is produced using two halftone screens at different screen angles and at different screen frequencies (measured in lines per inch) and to thereby emphasize one screen angle or screen frequency over the other.

In the example where a dot structure dot growth pattern is employed for a color being produced using the combined processing of two halftone screens at different screen angles an example of weighting factors to employ is illustrated in FIG. 28. As this figure illustrates the weighting factors at each pixel location may vary in accordance with the input image density for the local area. Thus, at lower image densities higher weight is given to the lower frequency dot screen. At higher local area image densities greater weight is given to the higher frequency dot screen.

There has thus been shown an improved printer and method of printing and method of encoding image data wherein color images may be printed with minimization of artifacts through representation of certain color separation images with a relatively pleasing rosette formed by simulating the generation of a color separation image by using the composite of two or more color separation images of the same color at different screen angles. The calculated composite of the two or more color separation images of the one color may then be printed and overlaid with dots formed by the various halftone screen patterns of the other different color separation images. These dots may be printed on the receiver and may be superimposed on each other at the same pixel location to form various shades of other colors.

In the embodiments of FIGS. 3-10 and 15-18 all the halftone screens illustrated may be processed using the dot structure dot growth pattern or alternatively all using the line structure dot growth pattern or further alternatively a mixture of some using the dot structure dot growth pattern and others using the line structure dot growth pattern it being understood that where a single-color is processed using two halftone screen angles the same type of dot growth pattern (line structure or dot structure) be used for both of those two halftone screen angles although as noted above the frequencies of the halftone screens may differ. Typical screen frequencies range from 130 lpi (lines per inch) to 220 lpi. Screen angles referred to herein are nominal values and might vary ±0.5° from the recited number.

Also as noted above the hi-fi color or other color separation image may be determined using three screen angles and the weighting factors for each adjusted so that the sum of the weighting factors is 1.0.

The invention has been described with reference to the preferred embodiments. Obviously, modifications and alternatives will occur to others upon reading the preceding detailed description. For example, as noted above that while the creation of gray level dots in individual pixel locations has been described as the preferred embodiment the invention in its broader aspects also contemplates the use of binary pixels for forming the line structure dot growth patterns in a halftone cell and/or the dot structure dot growth patterns in a halftone cell.

It is also contemplated that in lieu of printing image data that is a composite of color separation or mono-color image data processed at two or more different halftone screen angles, that separate printing may be made of the color separation image data of one color at each of two angles and combined on the receiver sheet to form the rosette or diamond structures described herein. For example, some ink jet printers employ redundant inks and may have two or more of at least some colors and such may be used to each generate a screen pattern at one screen angle in a particular color. It is intended therefore that the invention be construed as including all such modifications and alternatives in so far as they come within the scope of the appended claims or the equivalents thereof.

What is claimed is:

1. A processor for generating composite image data representing a mono-color input separation, the processor being adapted to:
   process the mono-color input separation data in accordance with a first halftone screen having a first screen angle to produce first halftone image data, wherein the first halftone image data includes a plurality of gray values for corresponding pixel locations, and each gray value represents a respective dot size, chosen from a plurality of different dot sizes, for the corresponding pixel;
   process the mono-color input separation data in accordance with a second halftone screen having a second screen angle different from the first screen angles to produce second halftone image data, wherein the second halftone image data includes a plurality of gray values for corresponding pixel locations, and each gray value represents a respective dot size, chosen from a plurality of different dot sizes, for the corresponding pixel; and
   combine the gray values of the first and second halftone image data to generate composite image data for the mono-color input separation such that the composite image data includes a first series of dot structures or line structures along lines at the first screen angle and a second series of dot structures or line structures along lines at the second screen angle, and the first and second series are present across the full tone scale, wherein the composite image data includes a plurality of gray values for corresponding pixel locations, each gray value represents a respective dot size, chosen from a plurality of different dot sizes, for the corresponding pixel, and the gray values of corresponding pixel locations in the first and second halftone image data are combined to generate gray values of the composite image data for those locations.

2. The processor of claim 1, wherein the processor is operative to process the mono-color input separation data in accordance with a dot structure dot growth pattern.

3. The processor of claim 2, further including a printer responsive to the composite image data for printing a corresponding printed separation as a rosette pattern.

4. The processor of claim 3, wherein the first and second screen angles are separated by 30°.

5. The processor of claim 3, wherein the first and second screen angles are separated by 60°.

6. The processor of claim 2, wherein the processor is further operative to process the mono-color input separation data in accordance with third halftone screen having a different screen angle than the first and second screen angles to provide third halftone image data including a plurality of gray values for corresponding pixel locations, and to combine the gray values of the first, second, and third halftone image data to generate composite image data.

7. The processor of claim 1, wherein the processor is operative to process the mono-color input separation data in accordance with a line structure dot growth pattern, so that the composite image data for the mono-color separation has a diamond structure.

8. The processor of claim 7, wherein the first and second screen angles are separated by 60°.

9. The processor of claim 7, wherein the first and second screen angles are separated by an angle within the range of 53° to 64°.

10. An apparatus for generating combined image data representing a plurality of mono-color input separations for respective, different colors, comprising:
a screen generator responsive to the respective mono-color input separation data of each mono-color input separation for generating a respective halftone screen for each mono-color input separation, and adapted to:
select one of the mono-color input separations;
process the mono-color input separation data for the selected mono-color separation in accordance with a first halftone screen having a first screen angle to produce first halftone image data, wherein the first halftone image data includes a plurality of gray values for corresponding pixel locations, and each gray value represents a respective dot size, chosen from a plurality of different dot sizes, for the corresponding pixel;
process the mono-color input separation data for the selected mono-color separation in accordance with a second halftone screen having a second screen angle different from the first screen angles to produce second halftone image data, wherein the second halftone image data includes a plurality of gray values for corresponding pixel locations, and each gray value represents a respective dot size, chosen from a plurality of different dot sizes, for the corresponding pixel; and
combine the gray values of the first and second halftone image data to generate respective composite image data for the selected mono-color input separation such that the respective composite image data includes a first series of dot structures or line structures along lines at the first screen angle and a second series of dot structures or line structures along lines at the second screen angle, and the first and second series are present across the full tone scale, wherein the respective composite image data includes a plurality of gray values for corresponding pixel locations, each gray value represents a respective dot size, chosen from a plurality of different dot sizes, for the corresponding pixel, and the gray values of corresponding pixel locations in the first and second halftone image data are combined to generate gray values of the respective composite image data for those locations;
process the respective mono-color input separation data for each non-selected mono-color input separation in accordance with the respective generated halftone screen to generate respective image data for the respective mono-color input separation; and
combine the composite image data for the selected mono-color input separation and the respective image data for the non-selected mono-color input separations to generate combined image data for output to a printer.

11. The apparatus of claim 10, wherein the processor is operative to process the selected mono-color input separation data in accordance with a dot structure dot growth pattern processing.

12. The apparatus of claim 11, further including a printer for printing the respective image data for the non-selected mono-color input separations as respective printed separations and for printing the respective composite image data for the selected mono-color input separation as a printed separation having a rosette pattern.

13. The apparatus of claim 12, wherein the printer includes four printer components for printing printed separations in cyan, magenta, yellow, and black, respectively.

14. The apparatus of claim 13, wherein the printer further includes hi-fi printer component for printing the respective composite image data for the selected mono-color input separation in a fifth color different from cyan, magenta, yellow, and black.

15. The apparatus of claim 10, wherein the selected mono-color input separation data is processed in accordance with a line structure dot growth pattern.

16. The apparatus of claim 12, wherein the printer is an electrostatographic printer.

17. The apparatus of claim 10, further including a printer for printing the respective image data for the non-selected mono-color input separations as respective halftone color separation images and for printing the respective composite image data for the selected mono-color input separation as a diamond structure pattern.

18. The apparatus of claim 17, wherein the printer includes four printer components for printing mono-color input separations in cyan, magenta, yellow, and black, respectively.

19. The apparatus of claim 18, wherein the printer further includes a hi-fi printer component for printing the respective composite image data for the selected mono-color input separation in a fifth color different from cyan, magenta, yellow, and black.

20. The apparatus of claim 19, wherein the printer is an electrostatographic printer.

21. A method for processing image data representing a mono-color input separation, the method comprising:
processing the mono-color input separation data in accordance with a first halftone screen having a first screen angle to produce first halftone image data, wherein the first halftone image data includes a plurality of gray values for corresponding pixel locations, and each gray value represents a respective dot size, chosen from a plurality of different dot sizes, for the corresponding pixel;
processing the mono-color input separation data in accordance with a second halftone screen having a second screen angle different from the first screen angles to produce second halftone image data, wherein the second halftone image data includes a plurality of gray values for corresponding pixel locations, and each gray value represents a respective dot size, chosen from a plurality of different dot sizes, for the corresponding pixel;
combining the gray values of the first and second halftone image data to generate composite image data for the mono-color input separation such that the composite image data includes a first series of dot structures or line structures along lines at the first screen angle and a second series of dot structures or line structures along lines at the second screen angle, and the first and second series are present across the full tone scale, wherein the composite image data includes a plurality of gray values for corresponding pixel locations, each gray value represents a respective dot size, chosen from a plurality of different dot sizes, for the corresponding pixel, and the gray values of corresponding pixel locations in the first and second halftone image data are combined to generate gray values of the composite image data for those locations; and printing the composite image data on a printer for generating a mono-color printed separation.

22. The method of claim 21, wherein the mono-color input separation data is processed in accordance with a dot structure dot growth pattern.

23. The method of claim 22, wherein the first and second screen angles are separated by 30°.

24. The method of claim 22, wherein the first and second screen angles are separated by 60°.

25. The method of claim 22, wherein the mono-color input separation data is further processed in accordance with a third halftone screen having a different screen angle than the first and second screen angles to provide third halftone image data including a plurality of gray values for corresponding pixel locations.

26. The method of claim 21, wherein the mono-color input separation data is processed in accordance with a line structure dot growth pattern, so that the composite image data of the mono-color input separation has a diamond structure.

27. The method of claim 26, wherein the first and second screen angles are separated by 60°.

28. The method of claim 26, wherein the first and second screen angles are separated by an angle within the range of 53° to 64°.

29. A method for printing combined image data representing a plurality of mono-color input separations for respective, different colors, comprising:

selecting one of the mono-color input separations;

generating a respective halftone screen for each non-selected mono-color input separation;

processing the respective mono-color input separation data for each non-selected mono-color input separation in accordance with the respective halftone screen to generate respective image data;

processing the mono-color input separation data for the selected mono-color input separation in accordance with a first halftone screen having a first screen angle to produce first halftone image data, wherein the first halftone image data includes a plurality of gray values for corresponding pixel locations, and each gray value represents a respective dot size, chosen from a plurality of different dot sizes, for the corresponding pixel;

processing the mono-color input separation data for the selected mono-color input separation in accordance with a second halftone screen having a second screen angle different from the first screen angles to produce second halftone image data, wherein the second halftone image data includes a plurality of gray values for corresponding pixel locations, and each gray value represents a respective dot size, chosen from a plurality of different dot sizes, for the corresponding pixel; and combining the gray values of the first and second halftone image data to generate respective composite image data for the selected mono-color input separation such that the respective composite image data includes a first series of dot structures or line structures along lines at the first screen angle and a second series of dot structures or line structures along lines at the second screen angle, and the first and second series are present across the full tone scale, wherein the respective composite image data includes a plurality of gray values for corresponding pixel locations, each gray value represents a respective dot size, chosen from a plurality of different dot sizes, for the corresponding pixel, and the gray values of corresponding pixel locations in the first and second halftone image data are combined to generate gray values of the respective composite image data for those locations;

combining the composite image data for the selected mono-color input separation and the respective image data for the non-selected mono-color input separations to generate combined image data for output to a printer; and printing the combined image data using a printer.

30. The method of claim 29, wherein the mono-color input separation data of the selected color is processed in accordance with a dot structure dot growth pattern.

31. The method of claim 30, wherein the respective image data for the non-selected mono-color input separations are printed in cyan, magenta, yellow, and black, respectively.

32. The method of claim 31, further including printing the composite image data of the selected mono-color input separation in a fifth color different from cyan, magenta, yellow, and black.

33. The method of claim 32, wherein the printing is performed using an electrophotographic printer.

34. The method of claim 29, wherein the mono-color input separation data of the selected color is processed in accordance with a line structure dot growth pattern.

35. The method of claim 34, further including printing the respective image data for the non-selected mono-color input separation as respective printed separations and printing the composite image data for the selected mono-color separation as a printed separation having a diamond structure pattern.

36. The method of claim 35, wherein the printer includes four components for printing mono-color separations in cyan, magenta, yellow, and black, respectively.

37. The method of claim 36, further including printing the composite image data of the selected mono-color input separation in a fifth color different from cyan, magenta, yellow, and black.

38. The method of claim 37, wherein the printer is an electrophotographic printer.

39. The method of claim 29, wherein the printer is an electrophotographic printer.

40. The apparatus of claim 14, wherein
  i) the selected mono-color input separation is a separation of a selected color, so that a complementary color of the selected color is defined;
  ii) one of the non-selected mono-color input separations is a complementary mono-color input separation of the complementary color, and is processed according to the first and second screen angles to generate respective composite image data; and
  iii) the respective composite image data for the selected mono-color input separation and for the complementary mono-color input separation are printed with the same rosette structure.

41. The apparatus of claim 40, wherein the selected color is blue and the complementary color is yellow.

42. The apparatus of claim 40, wherein the selected color is red and the complementary color is cyan.

43. The apparatus of claim 40, wherein the selected color is green and the complementary color is magenta.

44. The apparatus of claim 19, wherein
  i) the selected mono-color input separation is a separation of a selected color, so that a complementary color of the selected color is defined;

ii) one of the non-selected mono-color input separations is a complementary mono-color input separation of the complementary color, and is processed according to the first and second screen angles to generate respective composite image data; and iii) the respective composite image data for the selected mono-color input separation and for the complementary mono-color input separation are with the same diamond structure.

45. The method of claim 32, wherein
i) the selected mono-color input separation is a separation of a selected color, so that a complementary color of the selected color is defined;
ii) one of the non-selected mono-color input separations is a complementary mono-color input separation of the complementary color; and
iii) the respective composite image data for the selected mono-color input separation and for the complementary mono-color input separation are printed with the same rosette structure.

46. The method of claim 45, wherein the selected color is blue and the complementary color is yellow.

47. The method of claim 45 and wherein the selected color is red and the complementary color is cyan.

48. The method of claim 45 and wherein the selected color is green and the complementary color of the selected color is magenta.

49. The method of claim 37, and wherein:
i) the selected mono-color input separation is a separation of a selected color, so that a complementary color of the selected color is defined;
ii) one of the non-selected mono-color input separations is a complementary mono-color input separation of the complementary color; and
iii) the respective composite image data for the selected mono-color input separation and for the complementary mono-color input separation are printed with the same diamond structure.

50. The method of claim 49 and wherein the selected color is blue and the complementary color is yellow.

51. The method of claim 49 and wherein the selected color is red and the complementary color is cyan.

52. The method of claim 49 and wherein the selected color is green and the complementary color is magenta.

53. The method of claim 30, wherein
i) the selected mono-color input separation is a separation of a selected color, so that a complementary color of the selected color is defined;
ii) one of the non-selected mono-color input separations is a complementary mono-color input separation of the complementary color, and is processed according to the first and second screen angles to generate respective composite image data;
iii) the non-selected mono color input separation are separations of cyan, magenta and yellow; and
iv) the respective composite image data for the selected mono-color input separation and for the complementary mono-color input separation are printed with the same rosette structure.

54. The method of claim 53 and wherein the selected color is blue and the complementary color is yellow.

55. The method of claim 53 and wherein the selected color is red and the complementary at color is cyan.

56. The method of claim 53 and wherein the selected color is green and the complementary color is magenta.

57. The method of claim 35, wherein i) the selected mono-color input separation is a separation of a selected color, so that a complementary color of the selected color is defined;
ii) one of the non-selected mono-color input separations is a complementary mono-color input separation of the complementary color, and is processed according to the first and second screen angles to generate respective composite image data;
iii) the non-selected mono color input separation are separations of cyan, magenta, and yellow, and
iv) the respective composite image data for the selected mono-color input separation and for the complementary mono-color input separation are printed with the same diamond structure.

58. The method of claim 57 and wherein the selected color is blue and the complementary color is yellow.

59. A method for printing a multi-color image having first and second mono-color input separations for first and second different colors, respectively, the method comprising:
processing the respective mono-color input separation data of the first and second mono-color input separation images in accordance with a first halftone screen having a first screen angle to produce respective first halftone image data, wherein the first halftone image data includes a plurality of gray values for corresponding pixel locations, and each gray value represents a respective dot size, chosen from a plurality of different dot sizes, for the corresponding pixel;
processing the respective mono-color input separation data in accordance with a second halftone screen having a second screen angle different from the first screen angle to produce respective second halftone image data, wherein the second halftone image data includes a plurality of gray values for corresponding pixel locations, and each gray value represents a respective dot size, chosen from a plurality of different dot sizes, for the corresponding pixel;
combining the gray values of the respective first halftone image data and respective second halftone image data to generate respective composite image data for the mono-color input separations such that each respective composite image data includes a first series of dot structures or line structures along lines at the first screen angle and a second series of dot structures or line structures along lines at the second screen angle, and the first and second series are present across the full tone scale, wherein each respective composite image data includes a plurality of gray values for corresponding pixel locations, each gray value represents a respective dot size, chosen from a plurality of different dot sizes, for the corresponding pixel, and the gray values of corresponding pixel locations in the first and second halftone image data are combined to generate gray values of the composite image data for those locations; and
printing the respective composite image data on a printer to generate respective printed separations of the first and second colors, respectively, so that similar rosette structures are printed for each of the two colors, wherein the two colors are complementary colors to each other.

60. The method of claim 59, wherein the first color is blue and the second color is yellow.

61. The method of claim 59, wherein the first color is red and the second color is cyan.

62. The method of claim 59, wherein the first color is green and the second color is magenta.

* * * * *

UNITED STATES PATENT AND TRADEMARK OFFICE
CERTIFICATE OF CORRECTION

PATENT NO.         : 7,839,537 B2                                   Page 1 of 1
APPLICATION NO.    : 10/836762
DATED              : November 23, 2010
INVENTOR(S)        : Tai et al.

It is certified that error appears in the above-identified patent and that said Letters Patent is hereby corrected as shown below:

In Column 18, Claim 14, line 15, after "includes" and before "hi-fi" insert -- a --.

In Column 21, Claim 44, line 8, after "are" and before "with" insert -- printed --.

Signed and Sealed this
Thirteenth Day of December, 2011

David J. Kappos
*Director of the United States Patent and Trademark Office*